(12) United States Patent
Koontz et al.

(10) Patent No.: US 6,377,863 B1
(45) Date of Patent: Apr. 23, 2002

(54) COMPUTER-CONTROLLED OPERATION OF COMMAND-INPUT DEVICE OF AUTOMATED-PRODUCTION MACHINE

(75) Inventors: Eric James Koontz, Santee; Paul Philip Brown, San Diego, both of CA (US); Jens Ole Sorensen, Grand Caymen (KY)

(73) Assignee: Universal Ventures (KY)

( * ) Notice: Subject to any disclaimer, the term of this patent is extended or adjusted under 35 U.S.C. 154(b) by 0 days.

(21) Appl. No.: 09/283,656

(22) Filed: Apr. 1, 1999

(51) Int. Cl.[7] .............................................. G06F 19/00
(52) U.S. Cl. ........................................ 700/95; 700/197
(58) Field of Search .......................... 700/95, 200, 201, 700/204, 197

(56) References Cited

U.S. PATENT DOCUMENTS

| | | | |
|---|---|---|---|
| 3,582,965 A | 6/1971 | De Metrick | 369/11 |
| 3,978,524 A | 8/1976 | Gordon et al. | 369/1 |
| 4,141,658 A | 2/1979 | Ricca | 400/70 |
| 4,734,897 A | 3/1988 | Schotz | 369/2 |
| 5,224,216 A | 6/1993 | Gordon et al. | 710/2 |
| 5,457,590 A | 10/1995 | Barrett et al. | 360/133 |
| 5,470,218 A * | 11/1995 | Hillman et al. | 425/144 |
| 5,539,650 A * | 7/1996 | Hehl | 700/200 |
| 5,898,591 A * | 4/1999 | Hettinga et al. | 700/204 |
| 6,185,477 B1 * | 2/2001 | Palm et al. | 700/197 |
| 6,190,585 B1 * | 2/2001 | Brown et al. | 264/40.1 |
| 6,192,299 B1 * | 2/2001 | Kubota et al. | 700/282 |
| 6,207,087 B1 * | 3/2001 | Brown et al. | 264/40.1 |
| 6,289,259 B1 * | 9/2001 | Choi et al. | 700/197 |

* cited by examiner

*Primary Examiner*—William Grant
*Assistant Examiner*—Zoila Cabrera
(74) *Attorney, Agent, or Firm*—Edward W. Callan

(57) ABSTRACT

A system for operating a command-input device for an automated production machine to provide commands to the machine includes a status signal generator; a computer and apparatus for operating the command-input device. Commands for various functions of the machine may be provided to the machine by operation of the command-input device. The status signals indicate functional states of the automated production machine; the computer responds to the status signals by generating control signals; and the apparatus for operating the command-input device of the automated production machine does so in response to the control signals. In an embodiment in which the command-input device is mechanically operated by using a keyboard or a touch screen, a robotic device is used to operate the command-input device in response to the control signals. In an embodiment in which the command-input device is electronically operated, an adapter is inserted into an electromagnetically-operated recording-medium interface included in the command-input device to operate the command-input device in response to control signals provided by the computer to the adapter. Computer readable storage media are configured so as to cause computers to respond to the status signals that indicate the functional states of the machine by generating the control signals to which the robotic device and the adapter are respectively responsive.

26 Claims, 1 Drawing Sheet

COMPUTER-CONTROLLED OPERATION OF COMMAND-INPUT DEVICE OF AUTOMATED-PRODUCTION MACHINE

BACKGROUND OF THE INVENTION

The present invention generally pertains to automated-production machines and is particularly directed to operation of a command-input device for an automated-production machine.

An automated-production machine is a machine that makes products by a manufacturing process that includes one or more steps that are performed automatically by the machine during each production cycle in response to a series of commands for such performance. One example of an automated-production machine is an injection-molding machine. The individual commands can usually be modified after start-up, without interrupting an automated-production cycle, by using a mechanically operated device, such as a keyboard. The mechanically operated device is used to enter the initial commands to which the automated-production machine is to respond upon start-up when the machine is being used to produce a different product than previously produced by the machine; and data indicating the initial commands that have been entered by operation of the manual-input device are then stored on a recording medium that engages a recording-medium interface device that typically is included within the automated-production machine.

During a run-in phase between start-up and stabilized operation of the machine, an operator usually modifies at least some of the commands by operating the manual-input device upon ascertaining the status of given functional states of the machine either by direct observation or by reading various indicators that are coupled to sensors within the machine. The operator must maintain continuous concentration while operating the command input device and may have to rapidly modify several different commands within a brief duration. For example, when operating a keyboard-type command-input device for an injection molding machine, the operator may be required to operate the keyboard to modify the commands for the timing of various operating functions of the machine, such as when to close and open the mold and to inject plastic material into the mold, and the respective durations of the cooling period and the period during which the mold is maintained in an open state, in response to observing various functional states of the machine, such as ejection of products from the mold, the closing of the mold, the opening of the mold and whether the ejected products have been formed in accordance with predetermined dimensional specifications. In order to modify a single command, the operator frequently has to follow a complicated procedure of pressing several keys of the keyboard in a predetermined sequence.

It is desired to simplify and/or decrease the degree of participation and time required by the operator in the operation of the command-input device. Although one could modify an automated-production machine having a command-input device by bypassing the command input device so that the machine would respond to given commands that are generated electronically in response to sensing given functional states of the machine in lieu of commands that are generated by the command-input device, such a modification could void the manufacturer's warranty for the machine, especially when the command-input device is an OEM (original-equipment-manufactured) part of the machine.

SUMMARY OF THE INVENTION

In one aspect, the present invention provides a system for operating a mechanically or electromagnetically operated command-input device for an automated production machine, wherein commands for various functions of the machine may be provided to the machine by operation of the command-input device, the system comprising means for generating status signals that indicate functional states of the automated production machine; a computer for responding to said status signals by generating control signals; and a robotic device for operating the command-input device of the automated production machine in response to said control signals.

In another aspect, the present invention provides a system for operating a command-input device for an automated production machine, wherein commands for various functions of the machine may be provided to the machine by operation of the command-input device, and wherein the command-input device includes a recording-medium interface, the system comprising: means for generating status signals that indicate functional states of the automated production machine; a computer for responding to said status signals by generating control signals; and an adapter that responds to the control signals by operating the recording-medium interface to provide commands that cause the automated-production machine to function in accordance with commands defined by the control signals.

The present invention also provides methods of operating a command input device for an automated production machine and for manufacturing products with an automated production machine by operating a command input device in accordance with the above-described aspects of the present invention.

The present invention further provides computer readable storage media for use in computers in systems for operating command-input devices for automated production machines in accordance with the above-described aspects of the present invention.

Additional features of the present invention are described with reference to the detailed description of the preferred embodiments.

DETAILED DESCRIPTION

Figure 1:
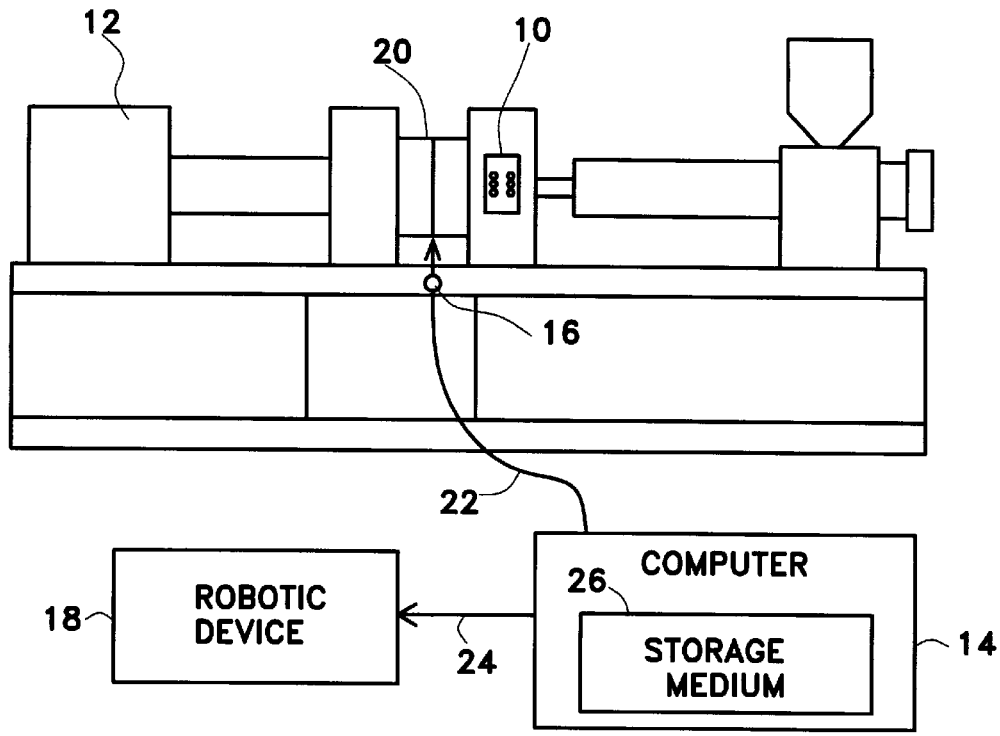
FIG. 1 is a diagram illustrating one preferred embodiment of a system according to the present invention.

Referring to FIG. 1, one embodiment of a system according to the present invention for operating a command-input device 10 for an automated-production machine 12 includes a computer 14, one or more sensors, such as the sensor 16, and a robotic device 18. In the illustrated embodiment the automated-production machine 12 is an injection-molding machine. The command-input device 10 is a mechanically operated device that includes a keyboard or a touch screen overlaying a video display. The touch screen overlies a video display, is semi-transparent, and includes a matrix of elements for indicating locations of the video display that include indicia for selecting input commands that are initiated by touching the portions of the touch screen overlying the selected displayed indicia. Typically, but not always, the command-input device 10 is an OEM part of the injection-molding machine 12. The machine 12 also includes an electromagnetically operated recording-medium interface (not shown) for use in storing the initial commands on a removable recording medium. However, such recording-medium interface is not part of the command-input device 10 in this embodiment.

The sensors 16 are disposed for sensing given functional states of the injection molding machine 12, such as a closed mold 20 (as shown), a closing mold, an open mold or ejection of a product from the machine (not shown). Some of the sensors 16 used in this embodiment of the system of the present invention may be OEM parts of the machine 12. The sensors 16 generate status signals 22 that indicate the sensed given functional states of the machine 12. The generated status signals 22 are provided to the computer 14.

The computer 14 processes the status signals 22 and responds thereto by generating control signals 24 that are provided to the robotic device 18. Particular control signals 24 define commands for specific functions of the machine 12.

The robotic device 18 is disposed over the command-input device 10 and operates the command-input device 10 in response to the control signals 24 from the computer 14. Operation of the command-input device 10 causes the machine 12 to function in accordance with the commands defined by the generated control signals 24. A robotic device for operating a keyboard is described in U.S. Pat. No. 4,141,658.

The computer 14 includes a computer readable storage medium 26 for use therein. The storage medium 26 is configured so as to cause the computer 14 to respond to the status signals 22 that indicate the functional states of the machine 12 by generating the control signals 24 to which the robotic device 18 is responsive.

Figure 2:
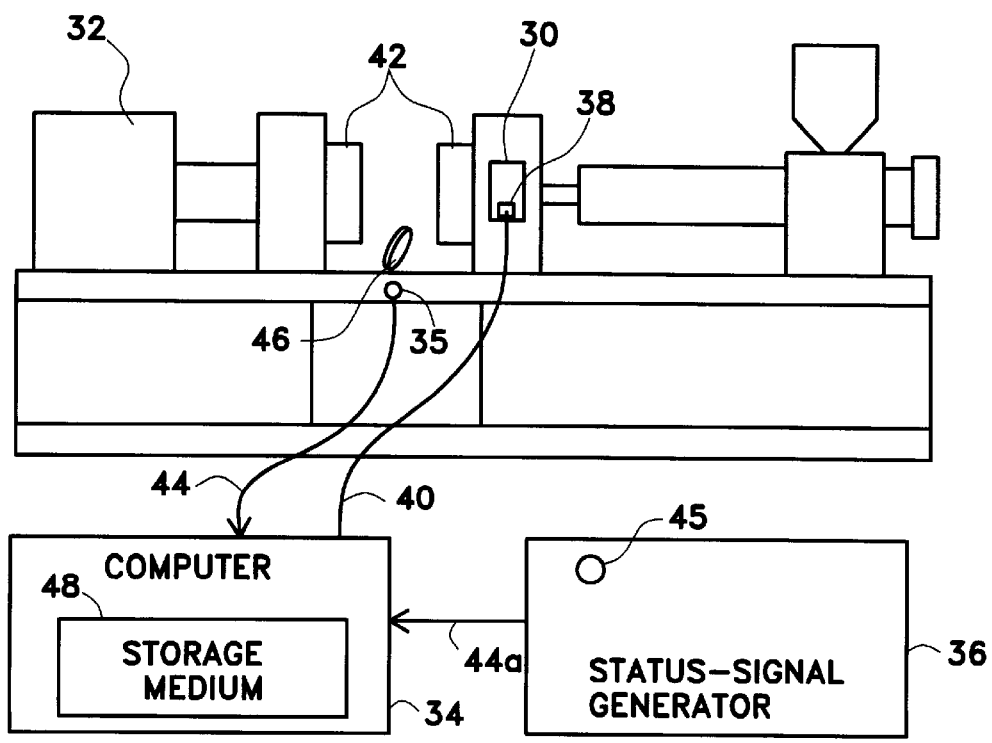
FIG. 2 is a diagram illustrating another preferred embodiment of a system according to the present invention.

Referring to FIG. 2, another embodiment of a system according to the present invention for operating a command-input device 30 for an automated-production machine 32 includes a computer 34, one or more sensors, such as the sensor 35, one or more manually operated status-signal generating devices 36, and an adapter 38. In the illustrated embodiment the automated-production machine 32 is an injection-molding machine. The command-input device 30 is an electronically operated device that includes an electromagnetically operated recording-medium interface, such as described above for engaging the recording medium upon which the initial commands are stored. Typically, but not always, the command-input device 30 is an OEM part of the injection-molding machine 32. The machine 32 also includes a mechanically operated device (not shown) for use in manually entering the initial commands, as described above. However, such mechanically operated device is not part of the command-input device 30 in this embodiment.

In this embodiment, after the initial commands have been stored on a recording medium inserted into the recording medium interface of the command input device 30, such recording medium is removed and the adapter 38 is inserted into the recording medium interface in lieu thereof. The adapter 38 operates the recording medium interface of the command-input device 30 in response to control signals 40 to provide commands for various functions of the automated-production machine 32 as defined by the control signals 40. Examples of adapters for operating various types of recording-medium interfaces are described in U.S. Pat. Nos. 5,224,216; 3,978,524; 4,734,897; 3,582,965 and 5,457,590.

The sensors 35 are disposed for sensing given functional states of the injection molding machine 32, such as a closed mold, a closing mold, an open mold 42 (as shown) or ejection of a product from the machine. Some of the sensors 35 used in this embodiment of the system of the present invention may be OEM parts of the machine 32. The sensors 35 generate status signals 44 that indicate the sensed given functional states of the machine 32. The generated status signals 44 are provided to the computer 34.

Each of the one or more manually-operated status-signal generating devices 36 includes at least one transducer, such as a switch operated by pushing a button 45, that may be activated by an operator to modify a command to the automated-production machine 32 upon making an observation that indicates a given functional state of the machine 32, to thereby generate a status signal 44a indicating the observed given functional state, such as the injection-molding machine having reached a desired stabilized state of operation during run-in, as indicated by an observation by the operator that an ejected product 46 has the specified dimensions. Examples of other observations that indicate a given functional state of the machine 32 that could prompt an operator to initiate generation a given status signal 44a include an observation that there is an undesired hole in the ejected product 46, or an observation that there is flashing on the ejected product 46. Separate manually operated status-signal generating devices 36 are included in the system of FIG. 2 for indicating each different significant functional state of the machine 32. The status signals 44a generated by the manually-operated status-signal generating devices 36 also are provided to the computer 34. The computer 34 processes the status signals 44, 44a and responds thereto by generating the control signals 40 that are provided to the adapter 38. Particular control signals 40 define commands for specific functions of the machine 32. The adapter 38 responds to the control signals 40 by operating the recording-medium interface to provide commands that cause the automated-production machine 32 to function in accordance with the commands defined by the control signals 40.

By use of the manually operated status-signal generating device 36 in combination with the adapter 38, an operator can modify a command to the automated-production machine 32 by pushing a single button 45 on the generating device in lieu of following the complicated procedure of pressing several keys of the keyboard in a predetermined sequence.

The computer 34 includes a computer readable storage medium 48 for use therein. The storage medium 48 is configured so as to cause the computer 34 to respond to the status signals 44, 44a that indicate the functional states of the machine 32 by generating the control signals 40 to which the adapter 38 is responsive.

In an alternative embodiment of the system shown in FIG. 2, no sensors are utilized to provide status signals 44, and all of the status signals 44a are provided to the computer 34 by use of a plurality of manually operated status-signal generating device 36. In an alternative embodiment of the system shown in FIG. 1, manually operated status-signal generating devices, such as the devices 36 used in the embodiment of FIG. 2, are utilized in addition to or in lieu of the sensors 16 to provide status signals to the computer 14. Another alternative embodiment (not shown) utilizes both the robotic device 18 and the adapter 38 as means for operating command-input devices 10, 30 in accordance with the above description of the embodiments shown in FIGS. 1 and 2. Many other alternative embodiments utilizing various features described with reference to FIGS. 1 and 2, and variations thereof, also will be obvious to those skilled in the art. In one alternative embodiment, in which the command-input device includes a computer mouse, the device for operating the command input device is a robotic device for operating a computer mouse. Also, electronic operations may be bioelectronic.

The advantages specifically stated herein do not necessarily apply to every conceivable embodiment of the present invention. Further, such stated advantages of the present invention are only examples and should not be construed as the only advantages of the present invention. While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A system for operating a mechanically or electromagnetically operated command-input device for an automated production machine, wherein commands for various functions of the machine may be provided to the machine by operation of the command-input device, the system comprising means for generating status signals that indicate functional states of the automated production machine;

a computer for responding to said status signals by generating control signals; and a robotic device for operating the command-input device of the automated production machine in response to said control signals.

2. A system according to claim 1, wherein the command-input device includes a keyboard.

3. A system according to claim 1, wherein the command-input device includes a touch screen.

4. A system according to claim 1, wherein the means for generating status signals includes at least one transducer for activation by a person.

5. A system according to claim 1, wherein the means for generating status signals includes means for sensing a given functional state of the automated production machine and for generating a status signal indicating said sensed given functional state; and at least one transducer for activation by a person to generate a status signal that indicates a given functional state of the automated production machine.

6. A system according to claim 1, wherein particular control signals define commands for specific functions of the machine.

7. A system according to claim 6, wherein operation of the command-input device causes the automated production machine to function in accordance with the commands defined by the generated control signals.

8. A system according to claim 1, wherein operation of the command-input device causes the automated production machine to function in accordance with the commands defined by the generated control signals.

9. A method of manufacturing products with an automatic production machine by operating a mechanically or electromagnetically operated command-input device for the automated production machine, wherein commands for various fractions of the machine may be provided to the machine by operation of the command-input device, the method comprising:

(a) generating status signals that indicate functional states of the automated production machine;

(b) responding to said status signals by generating control signal; and (c) operating the command-input device of the automated production machine with a robotic device in response to said control signals.

10. A method according to claim 9, wherein the command-input device includes a keyboard.

11. A method according to claim 9, wherein the command-input device includes a touch screen.

12. A method according to claim 9, wherein step (a) comprises generating a status signal by a person activating at least one transducer upon observing a given functional state of the automated production machine.

13. A method according to claim 9, wherein step (a) comprises the steps of:

(d) sensing a given functional state of the automated production machine;

(e) generating a status signal indicating said sensed given functional state; and (f) manually activating at least one transducer to generate a status signal that indicates a given functional state of the automated production machine.

14. A method according to claim 9, wherein particular control signals define commands for specific functions of the machine.

15. A method according to claim 14, wherein operation of the command-input device pursuant to step (c) causes the automated production machine to function in accordance with the commands defined by the generated control signals.

16. A method according to claim 9, wherein operation of the command-input device pursuant to step (c) causes the automated production machine to function in accordance with the commands defined by the generated control signals.

17. A computer readable storage medium for use in a computer in a system for operating a mechanically or electromagnetically operated command-input device for an automated production machine, wherein commands for various functions of the machine are provided to the machine by operation of the command-input device, wherein the storage medium is configured so as to cause the computer to respond to status signals that indicate functional states of the automated production machine by generating control signals to which a robotic device for operating the command-input device is responsive.

18. A storage medium according to claim 17, wherein particular control signals define commands for specific functions of the machine.

19. A system for operating a command-input device for an automated production machine, wherein commands for various functions of the machine may be provided to the machine by operation of the command-input device, and wherein the command-input device includes a recording-medium interface, the system comprising:

means for generating status signals that indicate fictional states of the automated production mache;

a computer for responding to said status signals by generating control signals; and an adapter that responds to the control signals by operating the recording-medium interface to provide commands that cause the automated-production machine to function in accordance with commands defined by the control signals.

20. A system according to claim 19, wherein the means for generating status signals includes at least one transducer for activation by a person.

21. A system according to claim 19, wherein the means for generating status signals includes:

means for sensing a given functional state of the automated production machine and for generating a status signal indicating said sensed given functional state; and at least one transducer for activation by a person to generate a status signal that indicates a given functional state of the automated production machine.

22. A method of manufacturing products with an automatic production machine by operating a command-input device for the automated production machine, wherein commands for various functions of the machine may be provided to the machine by operation of the command-input device, and wherein the command-input device includes a recording-medium interface, the method comprising (a) generating status signals that indicate functional states of the automated production machine;

(b) responding to said status signals by generating control signals; and (c) operating the recording medium interface with an adapter in response to the control signals to provide commands that cause the automated production machine to function in accordance with commands defined by the control signals.

23. A method according to claim 22, wherein step (a) comprises generating a status signal by a person activating at least one transducer upon observing a given functional state of the automated production machine.

24. A method according to claim 22, wherein step (a) comprises the steps of:

(d) sensing a given functional state of the automated production machine;

(e) generating a status signal indicating said sensed given functional state; and (f) manually activating at least one transducer to generate a status signal that indicates a given functional state of the automated production machine.

25. A computer readable storage medium for use in a computer in a system for operating a command-input device for an automated production machine, wherein commands for various functions of the machine are provided to the machine by operation of the command-input device, wherein the command-input device includes a recording-medium interface, and wherein the storage medium is configured so as to cause the computer to respond to status signals that indicate functional states of the automated production machine by generating control signals to which an adapter responds by operating the recording-medium interface to provide commands that cause the automated-production machine to function in accordance with commands defined by the control signals.

26. A storage medium according to claim 25, wherein particular control signals define commands for specific functions of the machine.

* * * * *

UNITED STATES PATENT AND TRADEMARK OFFICE
CERTIFICATE OF CORRECTION

PATENT NO.   : 6,377,863 B1
DATED        : April 23, 2002
INVENTOR(S)  : Koontz et al.

It is certified that error appears in the above-identified patent and that said Letters Patent is hereby corrected as shown below:

Column 5,
Line 58, "fractions" should read -- functions --.

Column 6,
Line 49, "mache" should read -- machine --.

Signed and Sealed this

Twenty-third Day of July, 2002

Attest:

Attesting Officer

JAMES E. ROGAN
Director of the United States Patent and Trademark Office